United States Patent
Cosgrove

(10) Patent No.: US 8,070,848 B2
(45) Date of Patent: Dec. 6, 2011

(54) AIR FILTER MOUNTING SYSTEM AND METHOD FOR FABRICATING THE SAME

(75) Inventor: Ron Cosgrove, Alton (GB)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 12/235,732

(22) Filed: Sep. 23, 2008

(65) Prior Publication Data

US 2010/0071323 A1   Mar. 25, 2010

(51) Int. Cl.
   *B01D 46/00*   (2006.01)

(52) U.S. Cl. .............. 55/502; 55/490; 55/498; 55/510; 411/542

(58) Field of Classification Search ............ 55/498, 55/502, 490, 505, 510; 411/369, 431, 542
   See application file for complete search history.

(56) References Cited

U.S. PATENT DOCUMENTS

| | | | | |
|---|---|---|---|---|
| 1,393,459 A | * | 10/1921 | Smith | 411/435 |
| 3,399,589 A | * | 9/1968 | Breed | 411/428 |
| 4,020,783 A | * | 5/1977 | Anderson et al. | 116/268 |
| 4,135,899 A | * | 1/1979 | Gauer | 55/482 |
| 4,300,928 A | | 11/1981 | Sugie et al. | |
| 4,304,580 A | * | 12/1981 | Gehl et al. | 55/482 |
| 4,314,832 A | * | 2/1982 | Fox | 55/482 |
| 4,482,368 A | | 11/1984 | Roberts | |
| 4,758,256 A | | 7/1988 | Machado | |
| 4,944,780 A | * | 7/1990 | Usmani | 55/337 |
| 5,803,941 A | * | 9/1998 | Berkhoel et al. | 55/498 |
| 5,827,025 A | * | 10/1998 | Henriksen | 411/11 |
| 5,895,510 A | * | 4/1999 | Butler et al. | 55/490 |
| 5,904,460 A | * | 5/1999 | Kawabata | 411/155 |
| 5,954,849 A | * | 9/1999 | Berkhoel et al. | 55/498 |
| 6,540,806 B2 | | 4/2003 | Reinhold | |
| 7,581,913 B2 | * | 9/2009 | Ordonio et al. | 411/542 |
| 2004/0103626 A1 | * | 6/2004 | Warth et al. | 55/467 |

* cited by examiner

*Primary Examiner* — Robert Clemente
(74) *Attorney, Agent, or Firm* — Armstrong Teasdale LLP

(57) ABSTRACT

An air filter mounting system includes a filter mounting element extending from an air intake, wherein the filter mounting element includes a locking plate, a filter support bolt coupled to and extending outward from the locking plate, a plurality of support legs extending from the air intake, wherein the plurality of support legs coupled to the locking plate, and a retaining nut sized to threadably engage the filter support bolt. The retaining nut includes a handle portion comprising a cavity defined therein, wherein the cavity is sized to receive at least a portion of a fastener therein, and an attachment portion including a threaded bore defined therein, wherein the attachment portion is sized to threadably receive the fastener therein, and wherein the threaded bore is substantially axially aligned with the cavity. The retaining nut includes a sealing skirt extending outward from the attachment portion and includes a flexible sealing surface.

20 Claims, 6 Drawing Sheets

AIR FILTER MOUNTING SYSTEM AND METHOD FOR FABRICATING THE SAME

BACKGROUND

The field of the disclosure relates generally to air filtration systems, and more specifically to air filter mounting assemblies.

Some known air intake filter systems used on gas turbine engines include a housing that houses a removable, replaceable filter cartridge. At least some known filter cartridges include an annular array of pleated paper that cooperates with a wall of the housing to define an inlet chamber, and an outlet chamber within the cartridge that communicates with a housing outlet defined in one end of the housing. Some known housings include a plurality of support legs that are coupled at one end using a bolt that extends through a hole defined in each leg. Such housings require each leg to be assembled in sequence and coupled to one another using a specially-designed carriage bolt.

Additionally, in some known systems, the filter cartridge is coupled within the housing a washer, and a filter retaining nut. Additionally in some known systems a rubber seal is coupled between the filter cartridge and the washer/nut combination to prevent contaminates from being introduced into the air intake of the engine. Moreover, in some known systems, a separate thread protector is positioned over an end of the exposed bolt threads to provide personal protection during filter change-out and maintenance operations from potentially sharp edges of the threads. However, such a system is generally time consuming to assemble because of the many individual components that may potentially be installed incorrectly, and/or dropped or lost during assembly. Furthermore, the use of a conventional washer/nut combination may also require an operator to use additional tools to assemble and tighten the filter cartridge components into place.

SUMMARY

In one aspect an air filter mounting system is provided. The systems includes a filter mounting element extending from an air intake, wherein the filter mounting element includes a locking plate, a filter support bolt coupled to and extending outward from the locking plate, a plurality of support legs extending from the air intake, wherein the plurality of support legs coupled to the locking plate, and a retaining nut sized to threadably engage the filter support bolt. The retaining nut includes a handle portion comprising a cavity defined therein, wherein the cavity is sized to receive at least a portion of a fastener therein, and an attachment portion including a threaded bore defined therein, wherein the attachment portion is sized to threadably receive the fastener therein, and wherein the threaded bore is substantially axially aligned with the cavity. The retaining nut includes a sealing skirt extending outward from the attachment portion and includes a flexible sealing surface.

In another aspect, a retaining nut is provided. The retaining nut includes a handle portion having a cavity defined therein, wherein the cavity is sized to receive at least a portion of a fastener therein, and an attachment portion including a threaded bore defined therein, wherein the attachment portion is sized to threadably receive the fastener therein, and wherein the threaded bore is substantially axially aligned with the cavity. The retaining nut includes a sealing skirt extending outward from the attachment portion and includes a flexible sealing surface.

In yet another aspect, a method for assembly an air filter mounting assembly is provided. The method includes coupling a plurality of support legs to a locking plate, coupling a threaded bolt to the locking plate such that a portion of the bolt extends outward from the locking plate, coupling the plurality of support legs to an outer periphery of an air intake, and coupling a retaining nut to the threaded bolt. The retaining nut includes a handle portion having a cavity defined therein, wherein the cavity is sized to receive at least a portion of a fastener therein. The retaining nut also includes an attachment portion that includes a threaded bore extending therethrough that is sized to receive the fastener therein, and a sealing skirt extending outward from the attachment portion includes a flexible sealing surface.

Various refinements exist of the features noted in relation to the above-mentioned aspects of the present invention. Additional features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION

Figure 1:
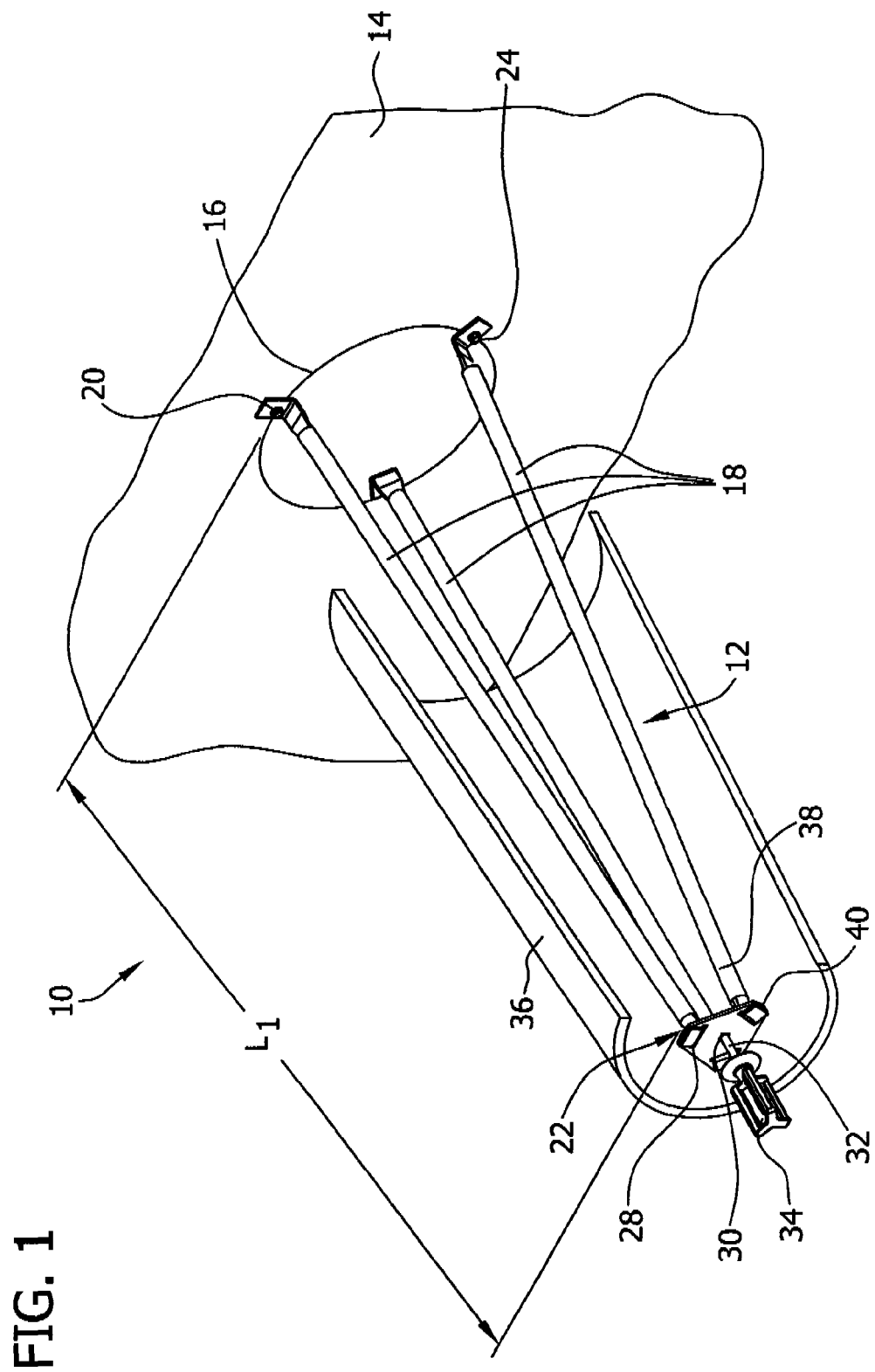
FIG. 1 is a perspective view of an exemplary air filter mounting system.
Figure 2:
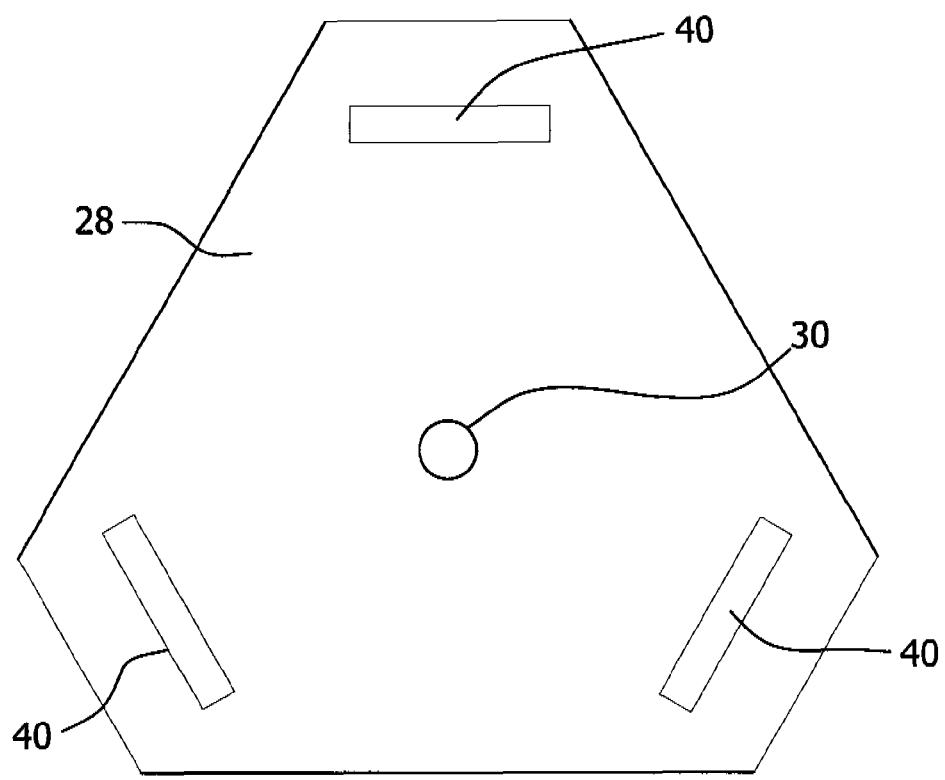
FIG. 2 is a schematic illustration of a locking plate used with the air filter mounting system shown in FIG. 1.

FIG. 1 is a perspective view of an exemplary air filter mounting system 10. FIG. 2 is a schematic illustration of a locking plate 28 used with mounting system 10. In the exemplary embodiment, air filter mounting system 10 includes a mounting assembly 12 that is coupled to and extends outward from a mounting surface 14, and more specifically, that is substantially centered about, and extending outward, from an air intake 16 defined on mounting surface 14. Mounting assembly 12 includes a plurality of legs 18, that each has a proximate end 20 and a distal end 22. Each proximate end 20 is coupled to mounting surface 14. In the exemplary embodiment, each leg 18 is coupled circumferentially about air intake 16 using a bolt 24. In the exemplary embodiment, mounting assembly 12 includes three legs 18 that each have a length $L_1$ and that are oriented in a tripod configuration 26. Alternatively, mounting assembly 12 may include any number of legs 18 coupled to mounting surface 14 in any orientation that enables air filter mounting system 10 to function as described herein.

Each leg distal end 22 is coupled to locking plate 28. In the exemplary embodiment, leg distal end 22 is welded to locking plate 28. Alternatively, each leg distal end 22 may be bolted to locking plate 28, or coupled to locking plate by any coupling device that enables air filter mounting system 10 to function as described herein. Additionally, locking plate 28 includes an aperture 30 that is sized to receive a threaded filter support bolt 32 therethough, such that the support bolt 32 extends outwardly from mounting surface 14, as shown in FIG. 1. In the exemplary embodiment, mounting assembly 12 also includes a filter retaining nut 34 that includes a corresponding threaded aperture (not shown in FIG. 1). Filter support bolt 32 is threadably coupled within the aperture to facilitate maintaining a filter 36 in a stationary position with respect to mounting assembly 12.

In the exemplary embodiment, each leg distal end 22 includes a flange 38 coupled to locking plate 28. Flange 38 may be formed by, for example, flattening and bending each leg distal end 22 to provide a hook-type flange thereto. Alternatively, flange may be formed by any method that enables air filter mounting system 10 to function as described herein. More specifically, locking plate 28 includes a plurality of slots 40 defined therein that correspond to the number of legs 18 used with mounting assembly 12. Slots 40 are circumferentially spaced about locking plate 28 and each is sized and oriented to receive a respective flange 38 therein. In the exemplary embodiment, mounting assembly 12 includes three legs 18 and locking plate 28 includes three corresponding slots 40. Alternatively, each distal end 22 may be coupled to locking plate 28 in any manner that enables air filter assembly 10 to function as described herein, including but not limited to bolting, welding, and/or friction fitting. Such a design reduces component count during assembly and facilitates the ease of installing mounting assembly 12 to mounting surface 14.

Figure 3:
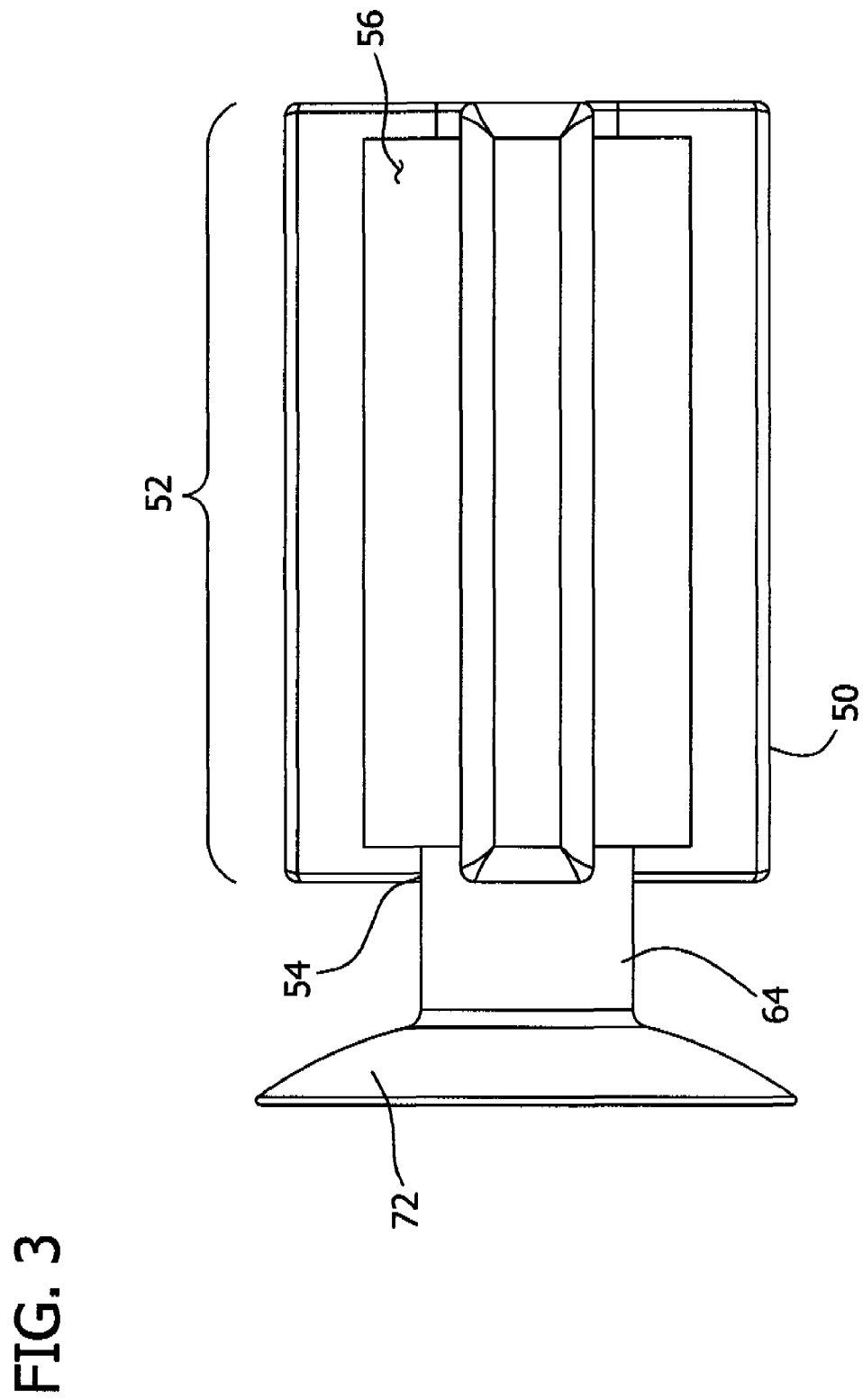
FIG. 3 is a side view of an exemplary mounting nut used with the air filter mounting system shown in FIG. 1.
Figure 4:
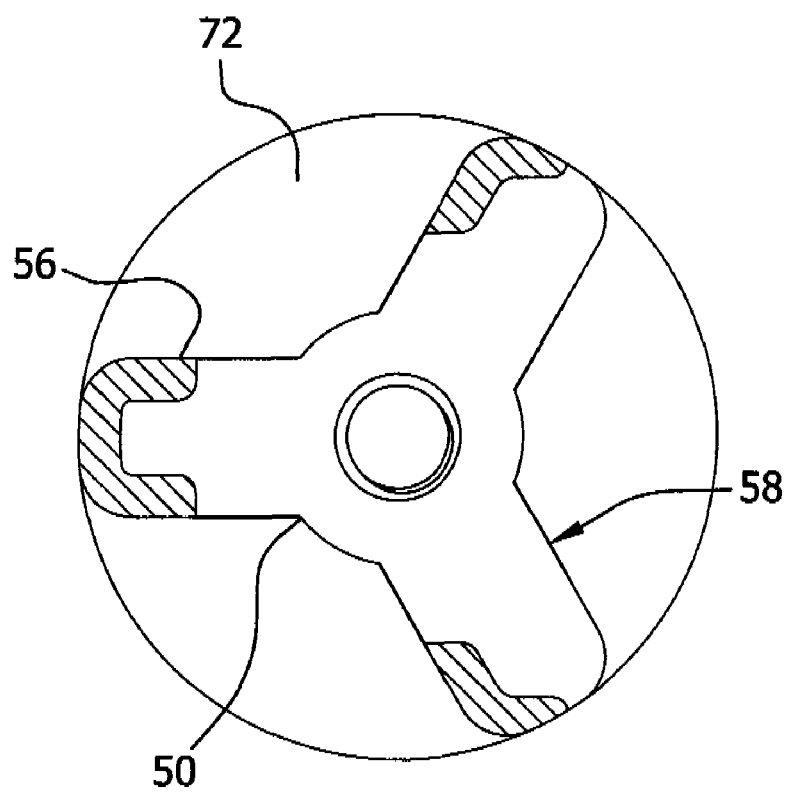
FIG. 4 is an end view of the mounting nut shown in FIG. 3.
Figure 5:
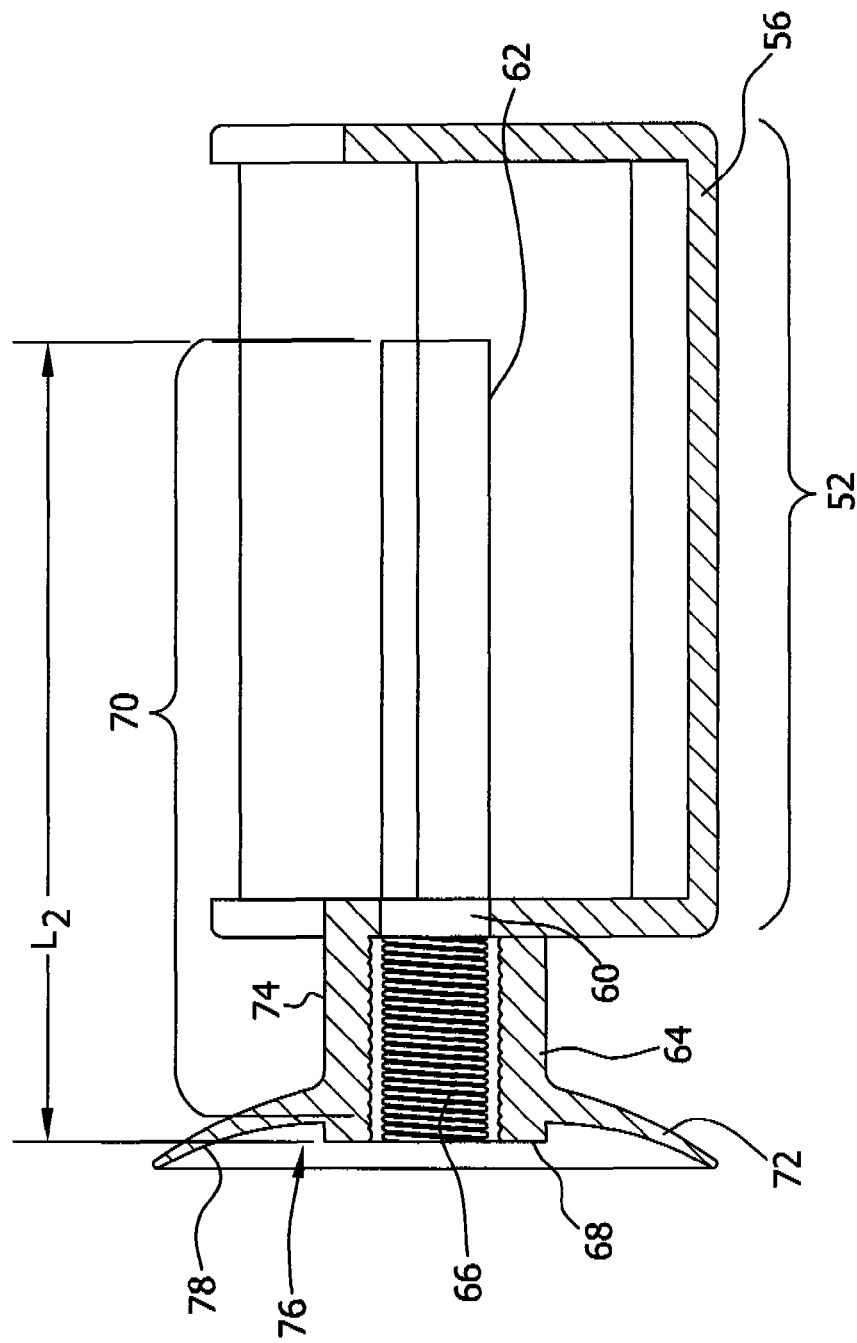
FIG. 5 is a cross-sectional view of the mounting nut shown in FIG. 3.

FIGS. 3, 4, and 5 are respective side, end, and cross-sectional views of an exemplary air filter mounting nut 50 used with air filter mounting system 10. In the exemplary embodiment, nut 50 is unitarily constructed by injection molding. Alternatively, nut 50 may be fabricated, for example, by joining individually molded or forged components. Nut 50 includes a handle portion 52 that includes an engaging end 54. In the exemplary embodiment, handle portion 52 includes a contoured gripping surface 56 that has a substantially Y-shaped cross-sectional shape 58 that facilitates hand tightening of nut 50, as described in more detail herein. Alternatively, handle portion 52 may have a rectangular, circular, elliptical, or any other cross-sectional shape that enables air filter mounting system 10 to function as described herein. In another alternative embodiment, handle portion 52 may include a surface (not shown) that enables nut 50 to be tightened with a tool (not shown), such as, but not limited to, a wrench and/or a screwdriver. During use, handle portion 52 provides a gripping surface that facilitates hand tightening without the need for additional tightening tools, thereby reducing part count for mounting system 10 and simplifying installation.

Handle engaging end 54 includes a channel 60 that extends to a substantially hollow, elongated cavity 62, as shown in FIG. 5. In the exemplary embodiment, a substantially cylindrical attachment portion 64 extends outward from nut engaging end 54. More specifically, in the exemplary embodiment, attachment portion 64 is substantially axially-aligned with channel 60 and includes a threaded aperture 66 that extends from engaging end 54 to an attachment portion distal end 68, that in combination with cavity 62 to forms a continuous opening 70 having a length $L_2$.

Nut 50 includes a substantially circular sealing skirt 72 that extends radially outward from an outer surface 74 of attachment portion 64. In the exemplary embodiment, sealing skirt 72 includes a deformable concave surface 76 and a peripheral lip portion 78 that extends outward from outer surface 74 for use in developing an air-tight seal (not shown) with an attachment surface (not shown), for example, filter 36 (shown in FIG. 1). Alternatively, nut 50 may include any sealing type configuration, such as for example a flap, a lip or an edge, that enables air filter mounting system 10 to function as described herein.

Such a configuration facilitates ensuring murphy-proof installation of the filter 36 upon mounting assembly 12 by combining previously separate parts together into one unit. Furthermore, retaining nuts 34 described herein are fabricated as a unitary molded component that includes a filter clamp, air-tight seal and thread protector in one unit that may be used to facilitate a reduced component count, cost effective, and more practical design for air filter mounting systems than currently existing filter mounting systems.

Figure 6:
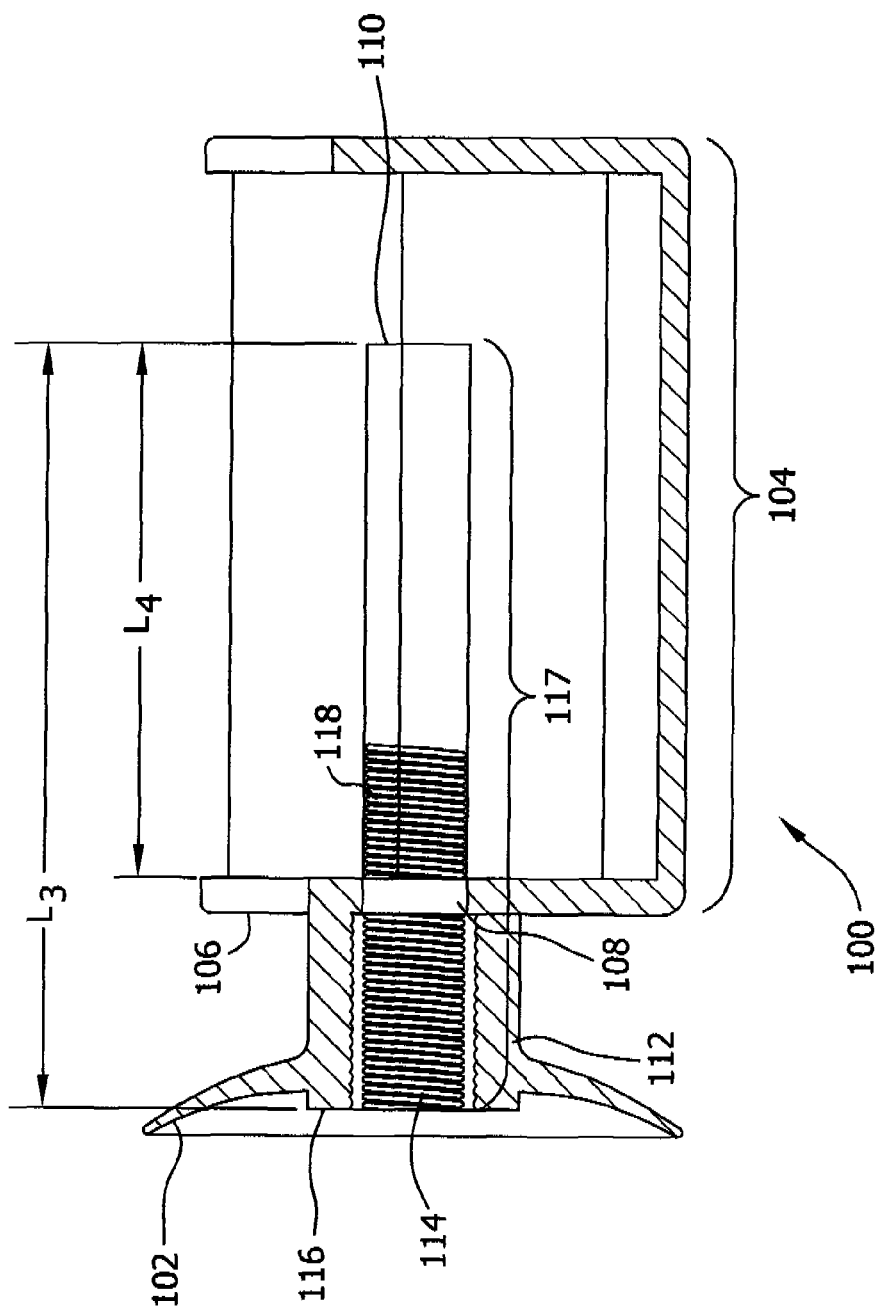
FIG. 6 is a cross-sectional view of an alternative mounting nut that may be used with the air filtering system shown in FIG. 1.

FIG. 6 is a cross-sectional view of an alternative mounting nut 100. Similar to nut 50 (shown in FIGS. 3 and 4), nut 100 includes a sealing skirt 102, and a handle portion 104 having an engaging end 106 that includes a channel 108 that extends inward to a substantially hollow, elongated cavity 110. In the exemplary embodiment, a substantially cylindrical attachment portion 112 extends outward from nut engaging end 106. More specifically, to the exemplary embodiment, attachment portion 112 is substantially axially-aligned with channel 108 and includes a threaded aperture 114 that extends from nut engaging end 106 to a distal end 116 of attachment portion 112, and in combination with cavity 10 forms a continuous opening 117 having a length $L_3$. In the illustrated embodiment, a portion 118 of cavity 110 is threaded and is sized to receive a threaded fastener (not shown) therein. In an alternative embodiment, an entire length $L_4$ of cavity 110 is threaded.

Exemplary embodiments of air filtration systems are described in detail above. The above-described air filtration mounting assemblies facilitate murphy-proof assembly by coupling previously separate parts together and mounting of a filter thereon. Furthermore, the retaining nuts described herein are fabricated as a unitary molded component that includes a filter clamp, air-tight seal and thread protector in one unit that may be used to facilitate a reduced component count, cost effective, and practical design for air filter mounting systems. Moreover, the present invention eliminates metal fasteners typically used to couple air filters to mounting brackets and thus eliminates the potential for rust to form on the nuts, causing components to seize. The embodiments contained herein provide a gripping surface that facilitates ease in hand-tightening. This feature may be useful for eliminating the need for additional tools used to tighten existing filter nuts.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

Although the apparatus and methods described herein are described in the context of using a unitary filter mounting nut component with a pre-assembled tripod filter frame for use with gas turbine engine air intakes, it is understood that the apparatus and methods are not limited to gas turbine engine applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A retaining nut for use in coupling a filter to a filter element, said retaining nut comprising:
   a handle portion comprising a cavity defined therein, said cavity sized to receive at least a portion of a fastener therein;
   an attachment portion comprising a threaded bore defined therein, said attachment portion sized to threadably receive the fastener therein, said threaded bore is substantially axially-aligned with said cavity; and
   a sealing skirt extending outward from said attachment portion and comprising a flexible concave sealing surface.

2. A retaining nut in accordance with claim 1, wherein said handle portion has one of a substantially Y-shaped, rectangular, elliptical, or circular cross-sectional shape.

3. A retaining nut in accordance with claim 1, wherein said handle portion and said sealing skirt are formed unitarily with said attachment portion.

4. A retaining nut in accordance with claim 3, wherein said retaining nut is injection molded.

5. A retaining nut in accordance with claim 1, wherein said cavity comprises an enclosed interior.

6. A retaining nut in accordance with claim 1, wherein at least a portion of said cavity is configured to threadably receive at least a portion of the fastener therein.

7. An air filter mounting system comprising:
   a filter mounting element extending from an air intake, said filter mounting element comprising:
      a locking plate;
      a filter support bolt coupled to said locking plate; and
      a plurality of support legs extending from the air intake, said plurality of support legs coupled to said locking plate; and
   a retaining nut configured to couple to said filter support bolt, said retaining nut comprising:
      a handle portion;
      a cavity extending into said handle portion, said cavity sized to receive at least a portion of said filter support bolt therein;
      an attachment portion comprising a threaded bore therethrough, said attachment portion sized to receive said filter support bolt therein, said threaded bore substantially aligned with said cavity; and
      a sealing skirt extending outward from said attachment portion and comprising a concave flexible sealing surface.

8. An air filter mounting system in accordance with claim 7, wherein said locking plate further comprises a plurality of slots defined therein and sized to receive a flange therein.

9. An air filter mounting system in accordance with claim 7, wherein said plurality of support legs each have approximately the same length.

10. An air filter mounting system in accordance with claim 7, wherein said handle portion has one of a substantially Y-shaped, rectangular, elliptical, or circular cross-sectional shape.

11. An air filter mounting system in accordance with claim 7, wherein said handle portion and said sealing skirt are formed unitarily with said attachment portion.

12. An air filter mounting system in accordance with claim 7, wherein at least a portion of said cavity is configured to threadably receive at least a portion of said filter support bolt therein.

13. An air filter mounting system in accordance with claim 7, wherein said cavity further comprises an enclosed interior sized to enclose a portion of said filter support bolt therein.

14. An air filter mounting system in accordance with claim 7, wherein said retaining nut is injection molded.

15. An air filter mounting system in accordance with claim 7, wherein said plurality of legs are circumferentially-spaced substantially equally about said locking plate.

16. A method for assembling an air filter mounting assembly, said method comprising:
   coupling a plurality of support legs to a locking plate;
   coupling a threaded bolt to the locking plate;
   such that a portion of the bolt extends outward from the locking plate;
   coupling the plurality of support legs to an outer periphery of an air intake;
   coupling a retaining nut to the threaded bolt, wherein the retaining nut comprises:
      a handle portion that includes a cavity defined therein that is sized to receive at least a portion of the threaded bolt therein;
      an attachment portion that includes a threaded bore extending therethrough, that is sized to receive the threaded bolt therein; and
      a sealing skirt that extends outward from the attachment portion to form a concave flexible sealing surface.

17. A method in accordance with claim 16, further comprising forming a seal about a filter surface when the retaining nut is coupled to the threaded bolt.

18. A method in accordance with claim 17, further comprising enclosing a portion of the threaded bolt within the nut cavity.

19. A method in accordance with claim 18, further comprising providing a plurality of slots within the locking plate, wherein each slot is sized to receive a flange therein.

20. A method in accordance with claim 16, wherein coupling a plurality of support legs to a locking plate further comprises circumferentially-spacing the support legs about the locking plate.

* * * * *

UNITED STATES PATENT AND TRADEMARK OFFICE
CERTIFICATE OF CORRECTION

| | | |
|---|---|---|
| PATENT NO. | : 8,070,848 B2 | |
| APPLICATION NO. | : 12/235732 | |
| DATED | : December 6, 2011 | |
| INVENTOR(S) | : Cosgrove | |

It is certified that error appears in the above-identified patent and that said Letters Patent is hereby corrected as shown below:

IN THE SPECIFICATIONS:
In column 1, line 23, delete "housing a washer," and insert therefor -- housing using a washer, --.

Signed and Sealed this
Twenty-first Day of February, 2012

David J. Kappos
*Director of the United States Patent and Trademark Office*